F. O. HOAGLAND.
DRILL.
APPLICATION FILED JAN. 19, 1918.
1,304,981. Patented May 27, 1919.
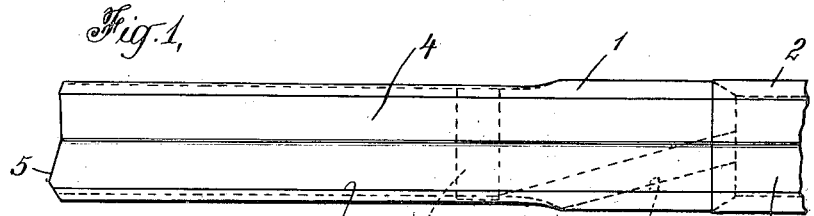
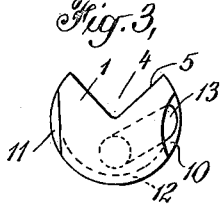
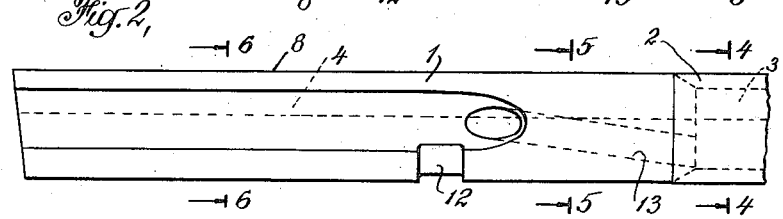
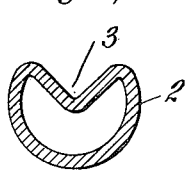
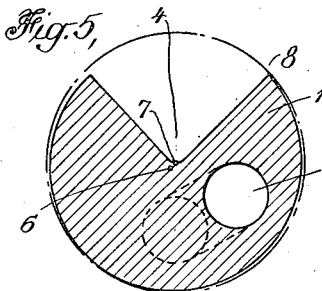
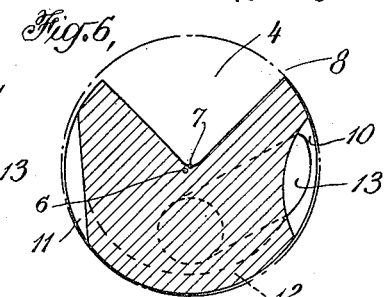
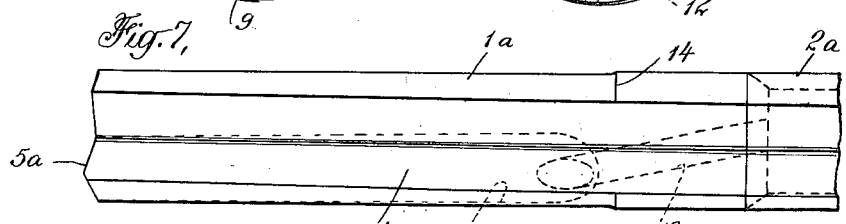
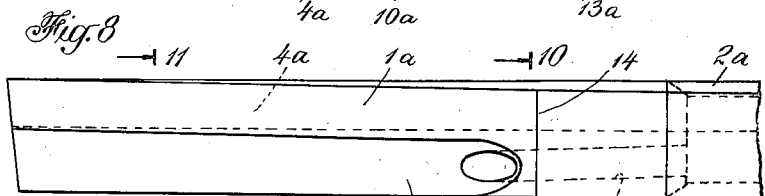
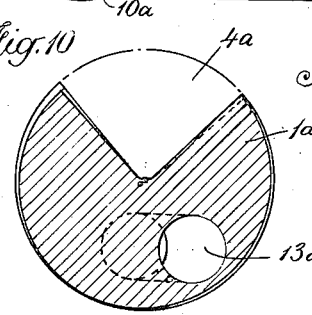
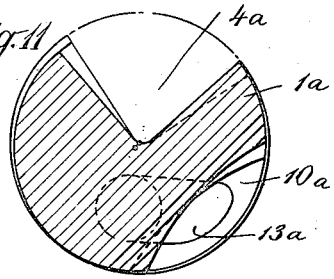
INVENTOR
Frank O. Hoagland
BY S. Jay Teller
ATTORNEY

UNITED STATES PATENT OFFICE.

FRANK O. HOAGLAND, OF HARTFORD, CONNECTICUT, ASSIGNOR TO PRATT & WHITNEY COMPANY, OF NEW YORK, N. Y., A CORPORATION OF NEW JERSEY.

DRILL.

1,304,981.        Specification of Letters Patent.      Patented May 27, 1919.

Application filed January 19, 1918. Serial No. 212,597.

*To all whom it may concern:*

Be it known that I, FRANK O. HOAGLAND, a citizen of the United States, residing at Hartford, in the county of Hartford and State of Connecticut, have invented certain new and useful Improvements in Drills, of which the following is a specification.

In the accompanying drawings I have shown two embodiments of the invention, but it will be understood that the drawings are to be considered as merely illustrative and not as defining or limiting the scope of the invention, the accompanying claims being relied upon for that purpose.

Of the drawings:

Figure 1 is a plan view of a drill embodying the invention.

Fig. 2 is a side view.

Fig. 3 is an end view.

Fig. 4 is a cross sectional view taken along the line 4—4 of Fig. 2.

Fig. 5 is a cross sectional view on an enlarged scale taken along the line 5—5 of Fig. 2.

Fig. 6 is a cross sectional view on the same scale as Fig. 5 taken along the line 6—6 of Fig. 2.

Fig. 7 is a plan view of a drill embodying the invention, the construction being different from that shown in Fig. 1.

Fig. 8 is a side view of a drill shown in Fig. 7.

Fig. 9 is an end view.

Fig. 10 is a cross sectional view on an enlarged scale taken along the line 10—10 of Fig. 8.

Fig. 11 is a cross sectional view on the same scale as Fig. 10 taken along the line 11—11 of Fig. 8.

Referring first to Figs. 1 to 5, 1 represents the drill tip which is constructed of a single piece of tool steel. This tip is secured by a brazing or otherwise to a tubular shank or stem 2 which is shaped in accordance with standard practice to form a cross sectional outline such as shown in Fig. 4, there being a longitudinal sectoral groove or depression at 3. The tip 1 is provided with a longitudinal sectoral groove at 4 which extends inward to the axis and which registers with the groove at 3 in the shank. The forward end of the tip is beveled, as shown, to provide a cutting edge 5 at one side of the groove 4.

The tip is approximately cylindrical in outline but the outer surface thereof is relieved to reduce the area of contact with the walls of the hole being drilled. As shown in Fig. 6, the outer surface of the tip is ground to conform to spirals constructed about a center 6 which is slightly eccentric of the center 7 of the hole being drilled. The spirals coincide with the cutting circles at a line 8 at the edge of the groove 4 adjacent the cutting edge 5 and their form is such that they are tangent to the cutting circles at a line 9 approximately opposite the said line 8. The spirals are continued beyond the line 9 and diverge inward from the cutting circles. The result is that the drill tip has contact with the walls of the drilled hole only along the lines 8 and 9, thus reducing friction to a minimum and preventing the drill from sticking. Preferably, to further reduce friction, the tip is slightly tapered, the diameter diminishing toward the rear. This taper is very slight and is therefore not shown in the drawings, it being in practice approximately one one-thousandth of an inch per inch.

It is necessary to supply oil to the cutting edge not only for lubrication and for cooling the drill, but also for the purpose of removing the chips. Heretofore drill tips have been constructed with longitudinal holes therein for the purpose of conducting oil to the cutting point, but much difficulty has been experienced in drilling these holes particularly for small drills which may be one-quarter of an inch or less in diameter. Drills have also been constructed with oil grooves which were closed by strips of metal, but this is expensive and is impractical for drills of small sizes. To avoid difficulties incident to the drilling of small holes throughout the entire length of the tip, and to avoid the difficulties incident to the closing of surface grooves, I provide one or more longitudinal oil grooves in the surface of the tip which are left entirely open. Open oil grooves have been heretofore proposed, but so far as I am aware no provision has been made for preventing the pressure of the oil from moving the drill out of center so as to cause it to cut too large. In accordance with my invention I so position the oil groove or grooves as to prevent any such movement of the drill. As shown in Figs. 1, 2, 3 and 6, there are two oil grooves 10 and 11 placed opposite each other and at substantially equal distances from the main sectoral groove 4. These two grooves 10 and 11 are suitably connected near their rear ends preferably, by a short circumferential groove 12. A drilled hole 13 connects the interior of the shank or stem 2 with one of the oil grooves, as for instance the groove 10.

In use, oil under pressure is supplied to the rear end of the stem 2 in the usual manner and this oil flows through the hole 13 to the groove 10, part of it branching through the groove 12 to the groove 11. The oil can not flow backward along the surface of the drill as the stem 2 is without spiral relief and has a close working fit in the hole. Inasmuch as the grooves 10 and 11 are opposite each other and of substantially equal widths, the lateral pressures exerted by the oil in the two grooves substantially balance each other and there is no tendency for the drill to be pushed to one side. The oil reaches the point of the drill where it serves to cool and lubricate the cutting edge. The oil flows backward through the longitudinal grooves 4 and 3, carrying with it the chips which are discharged at the outer end of the hole.

In Figs. 7 to 11 I have shown a drill which differs somewhat from that shown in Figs. 1 to 6, although it is in many respects similar. This drill is provided with a tip 1$^a$ and a shank 2$^a$ similar respectively to the tip 1 and shank 2 already described. The tip 1 has a longitudinal sectoral groove 4$^a$ which is slightly helical instead of straight as is the longitudinal groove 4. This helical groove causes the cutting edge at 5$^a$ to be somewhat sharper than it otherwise would be.

Preferably, as shown in Fig. 10, the drill tip is constructed with a spiral outline, being similar in this respect to the construction already described. The spirals coincide with the cutting circles at a line 8$^a$ at the edge of the groove 4$^a$ adjacent the cutting edge 5$^a$ and their form is such that they are tangent to the cutting circles at a line 9$^a$ approximately opposite the said line 8$^a$. These spirals are continued beyond the line 9$^a$ and diverge inward from the cutting circles. The result is that the drill tip has contact with the walls of the drill hole only along the lines 8$^a$ and 9$^a$. The front part is very slightly tapered and this taper terminates at 14. Preferably as illustrated, the spiral outline also terminates at 14, the rear part of the tip being exactly cylindrical in outline and having a close working fit in the hole.

In this construction I avoid the use of two opposite oil grooves as I find that for some classes of work the exact balancing of pressures is not essential. As illustrated, there is a single longitudinal oil groove 10$^a$ which is slightly helical to correspond to the helix of the groove 4$^a$. This groove 10$^a$ is connected by a hole 13$^a$ with the interior of the stem 2$^a$. In use, the oil flows from the interior of the stem 2$^a$ through the hole 13$^a$ and forward through the groove 10$^a$. The cylindrical section of the tip back of the circle 14 prevents oil from flowing backward along the surface of the drill. From the cutting edge the oil flows backward through the groove 4$^a$, carrying the chips with it. It will be observed that the groove 10$^a$ is so arranged as to exert a pressure which is approximately perpendicular to the cutting edge 5$^a$. The oil pressure is therefore almost exactly opposed to the reaction from the cutting operation. Furthermore, even if there should be a slight tendency for the oil pressure to move the drill out of center, such tendency would be resisted by the opposite part of the body which is remote from the cutting edge. There would be no tendency for the cutting edge to move outward and thus increase the diameter of the hole.

It will be noted that in the construction shown in Figs. 1 to 6 the oil groove 10 is between the lines 8 and 9, and that the oil groove 11 is between the line 9 and the edge of the groove 4. In the construction shown in Figs. 7 to 11 the oil groove 10$^a$ is between the lines 8$^a$ and 9$^a$. It will be seen that in either case the said lines of contact between the drill and the walls of the drill hole are not interrupted by the oil grooves. The contact with the hole walls along these lines therefore assists in preventing the escape of oil from the grooves circumferentially of the drill.

What I claim is:

1. A drill having a single longitudinal sectoral groove extending inward to the axis and having a cutting edge at one side of the groove at the front, the drill also having an open longitudinal oil groove separate from the sectoral groove and serving to deliver oil to the cutting edge from which the oil flows backward through the sectoral groove, the said oil groove being positioned adjacent the cutting edge whereby the reaction from the oil pressure is taken at a part of the drill remote from the cutting edge.

2. A drill having a single longitudinal sectoral groove extending inward to the axis and having a cutting edge at one side of the groove at the front, the drill also having two connected open longitudinal oil grooves separate from the sectoral groove and serving to deliver oil to the cutting edge from which the oil flows backward through the sectoral groove.

3. A drill having a single longitudinal sectoral groove extending inward to the axis and having a cutting edge at one side of the groove at the front, the drill also having two connected open longitudinal oil grooves separate from the sectoral groove and serving to deliver oil to the cutting edge from which the oil flows backward through the sectoral groove, the two oil grooves being opposite each other and of equal widths whereby the oil pressures therein are balanced.

4. A drill having a single longitudinal sectoral groove extending inward to the axis and having a cutting edge at one side of the groove at the front, the drill also having two open longitudinal oil grooves and an open circumferential oil groove connecting the longitudinal grooves, the oil grooves being separate from the sectoral groove and serving to deliver oil to the cutting edge from which the oil flows backward through the sectoral groove.

5. A drill having a single longitudinal sectoral groove extending inward to the axis and having a cutting edge at one side of the groove at the front, the surface of the drill being cylindrical at the rear and being relieved at the front to permit contact with the walls of the drilled hole only along two approximately opposite lines and the drill also having an open longitudinal oil groove separate from the sectoral groove and located between the two opposite lines and serving to deliver oil to the cutting edge, the body of the drill at the said opposite lines of contact serving to prevent the escape of oil from the groove circumferentially of the drill and the cylindrical part of the drill preventing oil from flowing backward along the drill surface and forcing it to flow backward from the cutting edge through the sectoral groove.

6. A drill comprising in combination, a tip having a single longitudinal sectoral groove extending inward to the axis and having a cutting edge at one side of the groove at the front, the tip also having two opposite connected open longitudinal oil grooves separate from the sectoral groove and serving to deliver oil to the cutting edge from which the oil flows backward through the segmental groove, and a hollow stem connected with the tip and having a longitudinal sectoral groove registering with the sectoral groove of the tip, the tip having an oil hole connecting the interior of the stem with the oil grooves.

7. A drill comprising in combination, a tip having a single longitudinal sectoral groove extending inward to the axis and having a cutting edge at one side of the groove at the front, the surface of the tip being relieved to permit contact with the walls of the drilled hole only along two approximately opposite lines and the tip also having an open longitudinal oil groove separate from the sectoral groove and located between the two opposite lines and serving to deliver oil to the cutting edge, the body of the drill at the said opposite lines of contact serving to prevent the escape of oil from the groove circumferentially of the drill, and a hollow stem connected with the tip and having a cylindrical surface and a longitudinal sectoral groove registering with the sectoral groove of the tip, the interior of the stem being connected with the oil groove in the tip and the cylindrical surface of the stem preventing oil from flowing backward along the drill surface and forcing it to flow backward from the cutting edge through the sectoral groove.

In testimony whereof, I hereto affix my signature.

FRANK O. HOAGLAND.